S. H. Little,
Horse Power.
No 33. Reissued July 1, 1841.
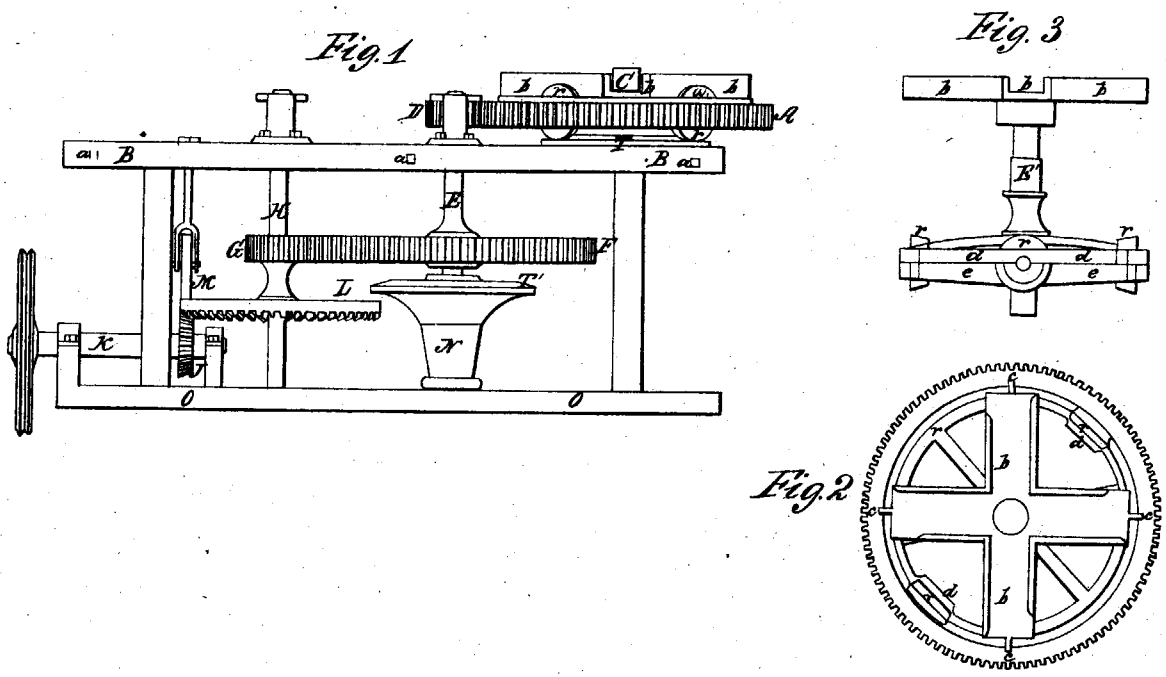
AM. PHOTO-LITHO. CO. N.Y. (OSBORNE'S PROCESS)

UNITED STATES PATENT OFFICE.

SAMUEL H. LITTLE, OF GETTYSBURG, PENNSYLVANIA.

IMPROVEMENT IN THE MANNER OF CONSTRUCTING A HORSE-POWER FOR DRIVING MACHINERY.

Specification forming part of Letters Patent No. 2,124, dated June 11, 1841; Reissue No. 33, dated July 1, 1841.

*To all whom it may concern:*

Be it known that I, SAMUEL H. LITTLE, of Gettysburg, in the county of Adams and State of Pennsylvania, have invented certain Improvements in the Manner of Constructing the Machine commonly denominated a Horse-Power, by which manner of construction it is made capable of being readily adapted to the power of two or four or any other varying number of horses; and I do hereby declare that the following is a full and exact description thereof.

In constructing my horse-power I so form the driving-wheel as that its rim, with the cogs thereon, is cast separately from the arms by which it is connected to the shaft, there being gains or notches cast in the inner side of said rim, into which the ends of the arms fit, and by which it is capable of being removed from one set of arms and placed upon another set of the same size. This arrangement, together with those of other parts of the instrument by which it is adapted to the intended purpose, will fully appear from an examination of the accompanying drawings, and the following references thereto.

Figure 1 is a side elevation of the whole machine, and Fig. 2 a top view of the main driving-wheel with the cross or troughs *b b* thereon, which are to receive and hold the sweeps or levers to which the horses are to be attached.

The arms of wheel in Fig. 2 are situated immediately under this cross or troughs *b b*, as shown by the dotted lines, their notched ends being seen at *c c*, where they are received within the notches or gains on the inner edge of the rim of the main driving-wheel, as represented in Fig. 1. The respective parts are so arranged as to adapt the machine to the power of two, four, or more horses, it being double-geared for that purpose. The driving-wheel A in this case revolves on a stationary pivot, C, rising from and affixed to the bed-piece T or upper cap-plank, B B, of the frame. To sustain the weight of this wheel and of the sweeps or levers attached thereto, instead of depending upon the pivot for its support, I employ four or any other preferred number of friction-wheels, *r r*, which turn on gudgeons in brace-pieces *d d*, which brace-pieces connect and are cast with the arms of the wheel A. The peripheries of the friction-wheels *r r* are made conical, and they are sustained upon a circular rail or bed-piece, T, affixed upon the top of the upper plank, B B, of the frame.

In Fig. 2 two of the brace-pieces *d d* are removed, for the purpose of showing the rail or bed-piece T below them. This bed-piece may consist of a rim of a sufficient width to become the bearing of the friction-rollers that sustain the driving-wheel, as represented in Fig. 2, or it may consist of a plate or disk with a hole in its center of sufficient size to pass over the shaft which it is to surround.

The part which constitutes the bearing for the friction-rollers must be beveled to adapt it to said rollers, that they may pass around it without rubbing friction.

D is a pinion on the shaft E, which shaft carries also a large spur-wheel, F, of the same diameter with the wheel A, and this gears into a pinion, G, on the shaft H. The shaft H carries a bevel-wheel, I, and this gears into the bevel-pinion J on the horizontal shaft K, that carries a band wheel or pulley, L. A guard-pulley, M, is used to prevent the rising of the bevel-wheel I. The gearing so far does not require any further explanation, it being similar to such as is well known and in common use, and its operation will be obvious to every machinist.

N is a standard affixed to and rising from the sill or base of the machine *o o*.

The shaft E has its step or lower bearing in the upper end of this standard, and its part T′ is so formed as to constitute a bearing for the friction-rollers *r r*, resembling, in this particular, the rim or bearing T, already described. The whole of the standard N may be of cast-iron.

Fig. 3 represents a shaft, E′, which, where less power is to be applied for propelling or driving machinery, may be substituted for the shaft E and its pinion D and spur-wheel F. The cross or troughs *b b* fit onto the upper end of E′, and in the part corresponding with the place of the wheel F on the shaft E the shaft E′ carries arms *e e*, the ends of which are so formed as to adapt them to the notches or gains in the rim of the main driving-wheel A, which may consequently be removed from the place it occupies in Fig. 1, and be dropped onto the arms *e e*. These arms are connected by brace-pieces *d d*, which receive and carry friction-rollers *r r*. The cap-plank B B is in two pieces fitted together where the respective shafts pass through it, and held in place by bolts, the heads of which are seen at *a a*, and which may be readily removed.

On substituting the shaft E′, Fig. 3, and its appendages for the shaft E and its appendages, and placing the rim of the wheel A in the situation of the spur-wheel F, the instrument, it will be apparent, will be adapted to the application of a diminished animal-power for its propulsion, while the weight of the levers and of the driving-wheel and its appendages will be sustained by the friction-rollers and the bearing upon which they rest. A similar result may be attained without removing the shaft E by so arranging the cross *b b* and the arms of the wheel A as will admit of the cross *b b* being placed on the upper end of the shaft E, where the pinion D now stands, and making the wheel F so that it may be lifted off from the shaft E, and the wheel A with its arms and friction-rollers occupy its place. By this means the shaft E′ and the extra arms attached to it would be dispensed with, but the fittings in this case would be less permanent, and the plan, therefore, is not to be preferred, and is merely given as a variation of the general principle.

This apparatus is susceptible of a third change by removing the shaft E and the wheels D and F, and removing the driving-wheel A, its pivot C, the circular rail or bed-piece T, and its appendages, and affixing them upon the top of the plank B B in such manner as that the pivot or center C of the driving-wheel A shall occupy the place occupied by the upper end of the shaft E, as it is now represented in the drawings. The pinion or wheel G is then to be removed from the place it now occupies on the shaft H and placed on its upper end, so that the wheel A shall gear into it as it is now represented as gearing into the pinion D. The pinion G must be held from turning on the upper end of the shaft H by means of a feather or polygonal eye or other well-known device for the same purpose. The same power may be obtained by another modification of the same apparatus, as follows: The wheel F may be left in gear with the pinion or wheel G in the manner shown in the drawings. The pinion or wheel D may be removed from the upper end of the shaft E. The bed T is to be removed and placed so as to surround the upper end of the shaft E, being, as before, affixed to and resting upon the plank B. The arms of the wheel A, with the cross *b b* attached to them, are then to be placed on the upper end of the shaft E, so as to occupy the place of the pinion D, and like it to turn the shaft E, but by the direct action of the sweeps or levers.

Having thus fully described the nature of my invention, and shown the manner in which my machine is constructed and operates, what I claim therein, and desire to secure by Letters Patent, is—

1. The manner in which I have arranged and combined together the cross or troughs for receiving the sweeps or levers, the arms and rim of the driving-wheel A, and the friction-rollers and their bearing so that they may be shifted from the position which they are represented as occupying in Fig. 1, and the respective parts thereof, so far as they are required, be transferred, in the manner herein set forth, so as to apply the motive power to the shafts E′, 1, or E, in the manner and for the purpose fully set forth and described in the foregoing specification.

2. The manner of constructing and arranging the shaft E′ with its appendages so as to adapt it to take the place of the shaft E, the weight and stress from the sweeps, the shaft, and the wheel thereon being borne by the aid of the friction-rollers on the part T′ of the standard N.

SAML. H. LITTLE.

Witnesses:
THOS. P. JONES,
SAML. WHITE.